(12) United States Patent
Seok

(10) Patent No.: US 7,509,147 B2
(45) Date of Patent: Mar. 24, 2009

(54) SCHEDULE MANAGING METHOD IN MOBILE COMMUNICATION TERMINAL

(75) Inventor: Yun-Hee Seok, Seoul (KR)

(73) Assignee: Samsung Electronics Co., Ltd (KR)

( * ) Notice: Subject to any disclaimer, the term of this patent is extended or adjusted under 35 U.S.C. 154(b) by 1145 days.

(21) Appl. No.: 10/328,243

(22) Filed: Dec. 23, 2002

(65) Prior Publication Data

US 2003/0119564 A1      Jun. 26, 2003

(30) Foreign Application Priority Data

Dec. 21, 2001    (KR) ............................... 2001-82545

(51) Int. Cl.
*H04B 1/38* (2006.01)
*H04M 1/00* (2006.01)

(52) U.S. Cl. .................. 455/566; 455/567; 455/404.2; 455/405; 455/412.1; 455/414.1

(58) Field of Classification Search ................. 455/566, 455/567, 404.1, 404.2, 405, 406, 412.1, 412.2, 455/414.1, 418
See application file for complete search history.

(56) References Cited

U.S. PATENT DOCUMENTS 5,821,928 A * 10/1998 Melkus et al. .............. 715/809
6,459,440 B1 * 10/2002 Monnes et al. .............. 715/808
6,628,936 B1 * 9/2003 Furuya .................... 455/412.1
6,928,300 B1 * 8/2005 Skinner et al. ........... 455/556.2
2002/0119807 A1 * 8/2002 Lee et al. .................... 455/567

* cited by examiner

*Primary Examiner*—Matthew D Anderson
*Assistant Examiner*—Shaima Q Aminzay
(74) *Attorney, Agent, or Firm*—The Farrell Law Firm, PC

(57) ABSTRACT

Disclosed is a schedule managing method in a mobile communication terminal that enables easy schedule determination and prevents the phenomenon of memory capacity shortage. In the mobile communication terminal having a display section for displaying an alarm and schedule data and a memory for storing the schedule data; the method includes a schedule-setting step of setting schedule contents and time, and storing the set schedule contents and time in the memory if an input of the schedule data is requested; a display step of controlling display of the alarm along with the schedule contents by controlling the display if the set schedule time elapses; and a step of stopping the alarm and deleting the schedule data if a user's acknowledgement is confirmed during the schedule display step. The schedule-setting step proceeds to a schedule-setting mode by one-time input of a request for reduced schedule, and an alarm time is set as an elapsed time from the present time during the schedule-setting step.

8 Claims, 2 Drawing Sheets

SCHEDULE MANAGING METHOD IN MOBILE COMMUNICATION TERMINAL

PRIORITY

This application claims priority to an application entitled "Schedule Managing Method In a Mobile Communication Terminal" filed in the Korean Industrial Property Office on Dec. 21, 2001 and assigned Serial No. 2001-82545, the contents of which are hereby incorporated by reference.

BACKGROUND OF THE INVENTION

1. Field of the Invention

The present invention relates to a method of managing application programs in a mobile communication terminal, and more particularly to a schedule managing method in a mobile communication terminal.

2. Description of the Related Art

Generally, a mobile communication terminal has been developed to perform communication as a user moves about. Great technical developments have been made for such mobile communication terminals to satisfy the ever increasing user demand. In accordance with the technical development of the mobile communication terminal, various ways to perform voice services and data services have been proposed, contributing to the development of mobile communication systems. Meanwhile, in the mobile communication terminal, a technique for convenient dialing has been developed as one of techniques for providing various kinds of convenience to the users.

Such techniques for providing user convenience include alarm setting, schedule determination, and functions for amusement, memo, etc. Among them, the schedule setting and alarming process will now be explained.

In case of setting a schedule in a mobile communication terminal, a user should select a menu and enter a schedule-setting mode. Thereafter, the user should set a date, time, method of performing an alarm, etc., and then perform a write operation to specify contents of the set alarm. If the time according to the set schedule elapses after the alarm is set, the mobile communication terminal performs the alarm in accordance with the method set by the user, and displays the contents that the user input by the write operation, to inform the schedule contents to the user. Accordingly, the user can easily confirm the schedule set by himself/herself.

According to this scheduling function, important contents of the set alarm, such as birthdays of friends or relatives, various anniversaries, etc., are written to prevent them from being forgotten. Meanwhile, due to the busy life of modem society, it may occur that the user should do something in the near future, e.g. after just 30 minutes or 1~2 hours. In this case, the user may store and confirm items to be done, using the scheduling function of the mobile communication terminal. However, the schedule determination is registered through the very complicated procedure, as described above.

Further, if the user once sets the alarm by setting the schedule, the schedule data is typically maintained until it is specifically deleted. Thus, if the schedule data is continuously used without deletion, a phenomenon of a memory capacity shortage presents itself, and this prevents any more data from being input. In order to prevent this phenomenon of memory capacity shortage, the user must identify and delete any unnecessary schedule data before setting the new schedule. Moreover, such deletion is performed through repetitive key manipulation, in a similar manner as the schedule-setting procedure.

SUMMARY OF THE INVENTION

Accordingly, the present invention solves the above-mentioned problems occurring in the related art, and an object of the present invention is to provide a schedule managing method in a mobile communication terminal that enables easy schedule determination.

It is another object of the present invention to provide a schedule managing method in a mobile communication terminal that prevents the phenomenon of memory capacity shortage.

In order to accomplish the above objects, there is provided a schedule managing method in a mobile communication terminal having a display section for displaying an alarm and schedule data and a memory for storing the schedule data; the method comprising a schedule-setting step of setting schedule contents and time, and storing the set schedule contents and time in the memory if input of the schedule data is requested; a display step of displaying the alarm along with the schedule contents by operating the display if the set schedule time elapses; and a step of stopping the alarm and deleting the schedule data if a user's confirmation is checked during the schedule display step.

Preferably, the schedule-setting step proceeds to a schedule-setting mode by one-time input of a request for a reduced schedule, and an alarm time is set as an elapsed time from the present time during the schedule-setting step.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a schedule managing method in a mobile communication terminal according to the preferred embodiment of the present invention will be described with reference to the accompanying drawings. For clarity, the following description of the present invention does not provide details of known functions and configurations, to avoid making the subject matter of the present invention unclear.

The process of setting and deleting schedule data performed in the mobile communication terminal according to the present invention will now be explained.

Figure 1:
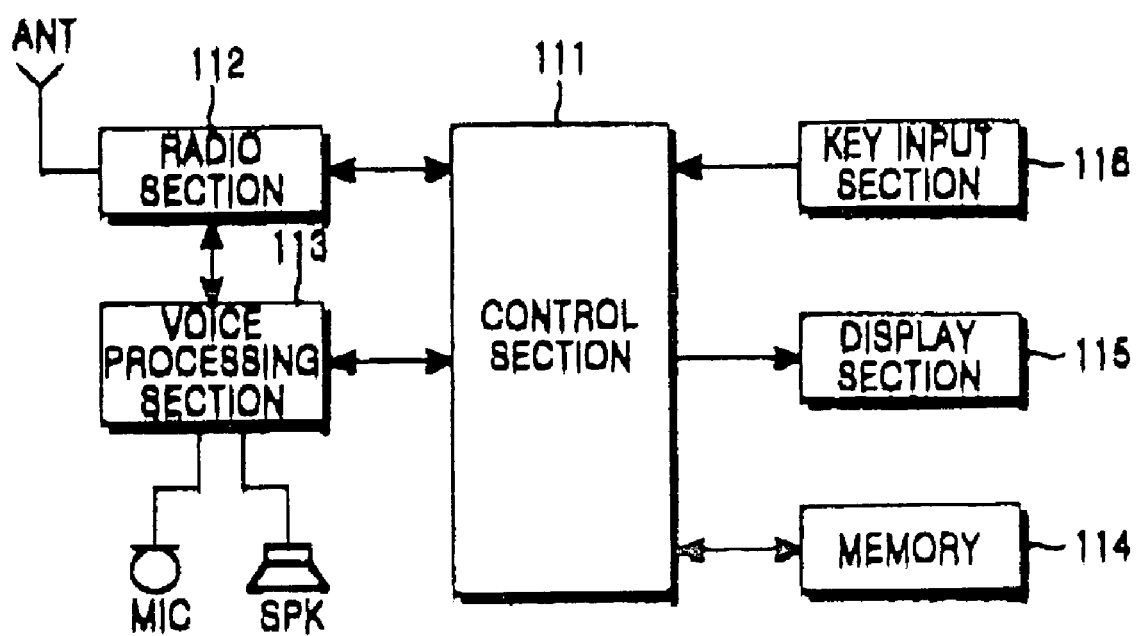
FIG. 1 is a block diagram of a mobile communication terminal incorporating the method according to the present invention.

FIG. 1 is a block diagram of a mobile communication terminal incorporating the method according to the present invention. The construction and operation of the mobile communication terminal incorporating the method of the present invention will be explained.

A control section 111 performs the overall control operation of the mobile communication terminal. The control section performs schedule determination and alarming functions, and controls deletion of the schedule data after performing the alarming function. This operation will be explained in detail with reference to a control flowchart of FIG. 2 to be explained later.

A radio section 112 is controlled by the control section 111. If a frequency signal of a radio channel of a specified frequency band is received through an antenna ANT, the radio section 112 down-converts the frequency signal, and outputs the converted signal to the control section 111 and/or a voice processing section 113 with the data received. The data output from the radio section 112 to the control section 111 may be text data, paging signals received through a paging channel, signaling signals, etc. The data outputted to the voice processing section 113 may be voice data received when a voice call is set. The radio section 112 up-converts the data received from the control section 111 or encoded voice data received from the voice processing section 113, and transmits the up-converted signal through the antenna as a radio signal of a specified frequency band.

The voice processing section 113 generally comprises a modem using a vocoder and so on, and driven under the control of the control section 111. The voice processing section 113 decodes and converts the encoded voice data received from the radio section 112 into an electric voice signal to output the voice signal though a speaker SPK. Thus, the speaker SPK converts and outputs the received electric voice signal as an audible signal. Also, the voice processing section 113 encodes an electric voice signal received from a microphone MIC and outputs the encoded voice signal to the radio section 112.

A memory section 114 may comprise ROMs and RAMs, and is divided into a region for storing required data during the control operation of the control section 111, a region defined by a user, and a region for temporarily storing data generated during the control operation. That is, the memory section 114 is a memory in that random access, read and write operations are possible. The memory section 114 typically includes a region for storing the required control data for mobile terminal operation according to the present invention. The control data according to the present invention will be explained later with reference to FIG. 2.

A display section 115 comprises a device, typically a liquid crystal display (LCD), which can display an operation state and other information, either as text, as an icon or otherwise. A vibration motor or an alarm lamp may also function for displaying the alarm. The LCD of the display section 115 displays the present state of the mobile communication terminal, and also displays data inputted by the user's key input as text data, icons, characters, or otherwise.

A key input section 116 generally has a key matrix structure, and includes numeral keys for dialing, function keys for performing various kinds of functions, etc. The key input section 116 generates key data corresponding to the key inputted by the user, and outputs the key data to the control section 111. In the present invention, the key input section 116 preferably includes selection keys and keys for upward, downward, right, and left movements.

Figure 2:
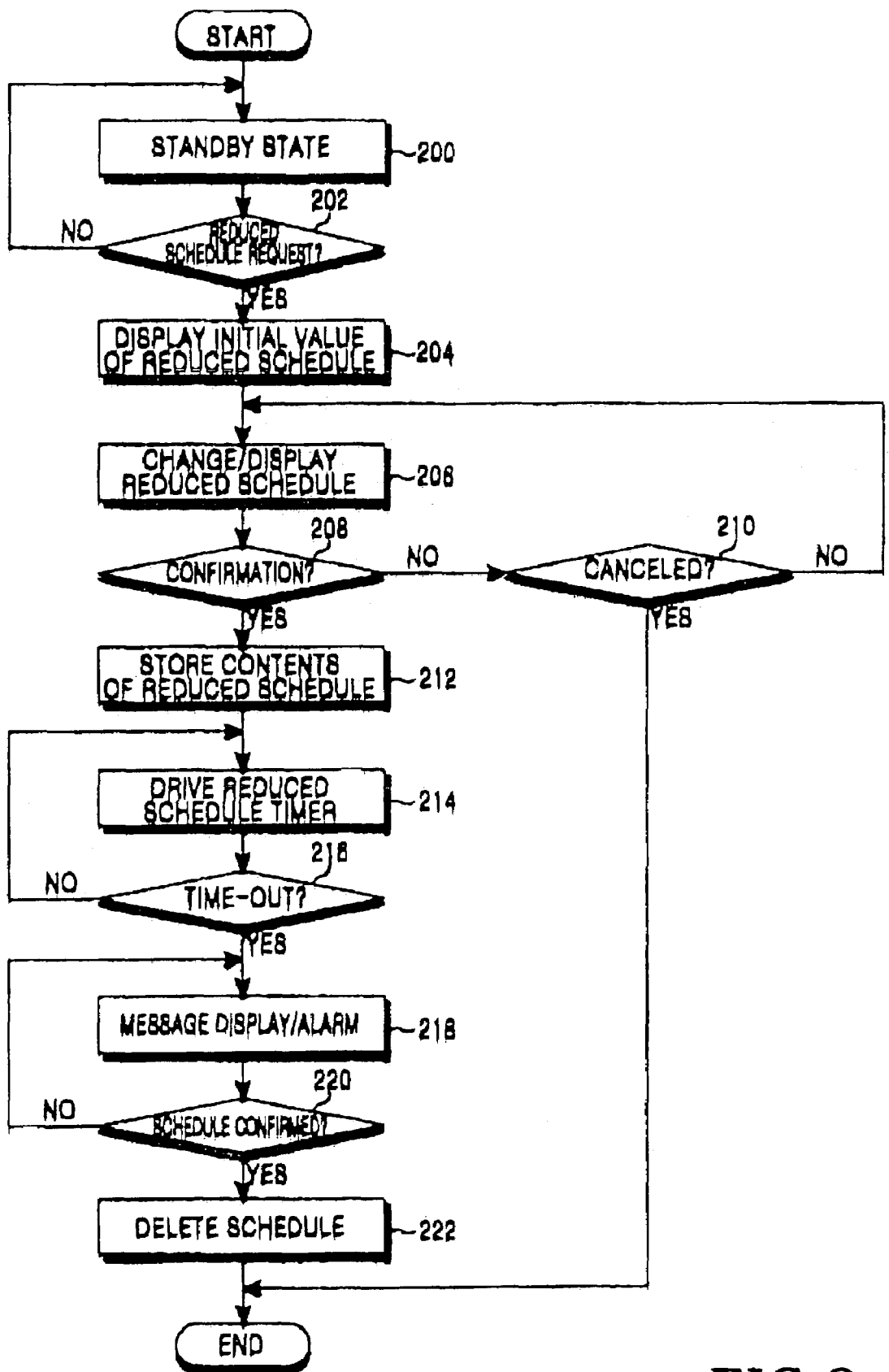
FIG. 2 is a flowchart illustrating the process of setting schedule data and controlling the set data thereafter according to a preferred embodiment of the present invention.

FIG. 2 is a flowchart illustrating the process of setting schedule data, which includes schedule contents and time, and controlling the set data thereafter according to a preferred embodiment of the present invention. Hereinafter, the process of setting and controlling the schedule data according to the present invention will be explained in detail with reference to FIGS. 1 and 2.

The control section 111 is typically in a standby state at step 200, and then proceeds to step 202 to check whether a request for a reduced schedule exists. Here, the request for a reduced schedule means an input signal provided for setting reduced scheduling. The request for reduced schedule may be inputted through a reduced schedule key separately provided in the key input section 116 or an input of a specified key for more than a preset time period. Also, the request for reduced schedule may be inputted through an input of the user's voice in addition to the key signal. That is, in the present invention, the request for reduced schedule generally indicates the case that the schedule input can be performed by one- or two-key strokes, without the user having to input several keystrokes or search the menu. Accordingly, the schedule-setting mode can be entered through the request for a reduced schedule without passing through a complicated procedure. The following is described for cases using the specified key.

If it is confirmed that a request for a reduced schedule exists as a result of checking at step 202, the control section 111 proceeds to step 204 to read out an initial schedule value from the memory 114 and to display the read-out initial schedule value. At this time, for example, the present data and time, and the data and time when the schedule is requested, may be displayed, or a separate data input window for inputting a schedule contents may be provided. Also, as described below in reference Table 2, the control section 111 may cause the display section 115 to display the time when the alarm for notifying the schedule may be set as a fixed time, 10 minutes before the fixed time, 30 minutes before the fixed time, etc.

The example illustrated in Table 1 will now be described.

TABLE 1

Schedule Registration
Dec. 25, 2001
Tuesday, 14:30
<Contents>
Alarm Time
- 30 minutes to alarm -

The "schedule registration" illustrated in the first line of Table 1 indicates a schedule registration mode, and "Dec. 25, 2001, Tuesday, 14:30" in the second to third lines indicates the present time. "Contents" means the schedule contents, which can be received and displayed according to the user's key input. Also, the contents as displayed above is stored as the schedule contents. "Alarm Time" means the time when the alarm is desired. In this embodiment "—30 minutes to alarm—" is not directly input by user. Rather, the user inputs an Alarm Time at which the alarm is to be given to the user, and in response to the key input a reference time is calculated and displayed.

The reference time is the difference between the present time and the alarm time, and indicates how much time is left before the alarm will be given to the user. The alarm can be set through the above-described manner.

Further, in case of using the specified key, the alarm mode is entered by pressing the specified key a little longer. At this time, the alarm time initially displayed on the display section 115 is a default value, and is set as a value of "10 minutes". Thereafter, whenever the specified key is pressed for a short time, the value of the alarm time is increased by 10 minutes. Of course, it should be understood that the increased value can be set by 5 minutes, 1 minute or another time period.

Alternatively, an input window may be displayed of the schedule contents to be set, the present time, and what preset period of time after the present time the schedule contents will be displayed to the user. This may be displayed as shown in Table 2.

TABLE 2

Schedule Registration
Dec. 25, 2001
Tuesday, 14:30
<Contents>
Alarm Time - 10 minutes after the present time -

In comparison to Table 1, Table 2 indicates a different manner by which to select the alarm time. That is, the alarm time is set by selecting a preset time period after the present time that the alarm will be produced.

Hereinafter, explanation will be made on the assumption that the schedule determination is made in the manner as illustrated in Table 2. However, it goes without saying that this alarm time determination can also be applied to the case where the alarm time is determined in the manner as illustrated in Table 1. Here also, in case of using the specified key, the alarm mode is entered by pressing the specified key a little longer. At this time, an alarm time initially displayed on the display section 115 is a default value, and is set as a value of "10 minutes".

Thereafter, whenever the specified key is pressed for a short time, the value of the alarm time is increased by 10 minutes. Of course, it should be also understood that the increased value can be set by 5 minutes, 1 minute, etc. Accordingly, in the present invention, entering the alarm mode and setting alarm time can be accomplished by a single key.

After displaying the alarm time as illustrated in Table 2, the control section 111 proceeds to step 206 to set the contents and the time of the reduced schedule according to a key value inputted from the key input section 116. As changing the contents and the time of the alarm as above, the control section 111 proceeds to step 208 to check whether a confirmation key has been inputted whenever any key is inputted from the key input section 116. That is, the control section checks whether a key which indicates completion of the registration has been inputted.

If through checking it is confirmed that the confirmation key is inputted, the control section 111 proceeds to step 212; otherwise it checks whether a cancel key has been inputted. That is, the control section checks if a key for canceling the registration has been inputted. If through checking it is confirmed that the cancel key has been inputted, the control section terminates the routine. However, if the inputted key is not the confirmation key or the cancel key, the control section proceeds in step 206 to change the contents of the reduced schedule, and displays the changed contents on the display section 115.

If through checking at step 208 it is confirmed that the confirmation key has been inputted, after the completion of the schedule determination at step 206, the control section 111 proceeds to step 212. At step 212, the control section 111 stores the inputted schedule contents in the corresponding region of the memory 114. Then the control section proceeds to step 214 to drive a reduced schedule timer. Here, the timer may be an external timer, or a timer using the memory 114 or the control section 111. Also, the time as inputted in Table 2 is set in the timer to drive the timer. An example of this will now be explained.

In the event that the user intends to write a memo of "Call Candy after 30 minutes", the user inputs a message of "Telephone call to Candy" in the "contents" part displayed on the display section as illustrated in Table 2. The user also sets the alarm time to 30 minutes after the present time. Then, the control section 111 stores the contents as above in the memory 114, sets the timer for 30 minutes, and drives the set timer.

After the timer is driven at step 214, the control section 111 proceeds to step 216 to check whether a time-out signal is received from the timer being driven. If the checking indicates that the time-out signal is received, the control section 111 proceeds to step 218, while if not, it returns to step 214 to continuously drive the timer. If the time-out signal has been received from the timer, the control section 111 proceeds to step 218 to read out and display the schedule contents stored in the memory 114 and perform the alarm through an alarm device provided. This alarm may be an alarm through a display, a bell, a lamp, or a vibration motor, and one or more alarms may be simultaneously performed.

The control section 111 displays the message and the alarm at step 218, and then proceeds to step 220 to check whether the schedule confirmation key has been input. That is, the control section checks if the user has confirmed the schedule. If through checking it is confirmed that the schedule has been confirmed, the control section 111 proceeds to step 222, while if not, it continuously performs the alarm at step 218. If the confirmation key has been input, the control section proceeds to step 222 to stop the alarm, delete the schedule data, and terminate the routine. The schedule contents are automatically deleted through the above process even if the user does not directly delete the schedule contents, and thus the phenomenon of memory capacity shortage is prevented.

Although the process of inputting and managing one block of schedule data has been explained in the embodiment of FIG. 2, the management of at multiple blocks of schedule data can be performed in the same manner as above.

As described above, the present invention has the advantages that the determination of the schedule can be conveniently performed in a mobile communication terminal, and the management of the schedule can be performed without individually or specifically deleting the schedule data blocks.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A schedule managing method in a mobile communication terminal having a display section for displaying an alarm and schedule data and a memory for storing the schedule data, the method comprising:
    a schedule-setting step of setting schedule contents and time, and storing the set schedule contents and time in the memory;
    a display step of displaying the alarm along with the schedule contents by operating the display section if the set schedule time elapses; and
    a step of stopping the alarm and deleting the schedule data stored in the memory if a user's confirmation is confirmed during the schedule display step.

2. The schedule managing method of claim 1, wherein the schedule-setting step proceeds to a schedule-setting mode by one-time input of a request signal for a reduced schedule.

3. The schedule managing method of claim 2, wherein an alarm time is set as an elapsed time from the present time during the schedule-setting step.

4. The schedule managing method of claim 1, wherein, at the schedule-setting step, an alarm time is set after a preset time period from the present time.

5. The schedule managing method of claim 1, wherein at the schedule-setting step, the setting of an alarm time is performed by the steps of:

setting a reference time in response to a key input; and setting a specified time before or after the reference time as an alarm producing time in response to the key input made after the reference time is set.

6. The schedule managing method of claim 2, further comprising the steps of:

at the schedule-setting mode, displaying a default value on the display section; and at the schedule-setting mode, increasing the default value by a preset value in response to input of the request signal for the reduced schedule.

7. The schedule managing method of claim 1, further comprising the steps of:

when a request signal for the reduced schedule is inputted for more than a preset time period, entering a schedule-setting mode and displaying a default value on the display section; and when the request signal for the reduced schedule is inputted for less than the preset time period at the schedule-setting mode, increasing the default value by preset values in response to the number of times the request signal is input.

8. The schedule managing method of claim 1, further including a display step for displaying a reference time at a predetermined time before the set schedule time elapses.

* * * * *